United States Patent [19]

Brissette

[11] Patent Number: 4,573,946
[45] Date of Patent: * Mar. 4, 1986

[54] DRIVELINE

[75] Inventor: Ronald N. Brissette, Medina, Ohio
[73] Assignee: Rockwell International Corporation, Pittsburgh, Pa.
[*] Notice: The portion of the term of this patent subsequent to Jul. 17, 2001 has been disclaimed.
[21] Appl. No.: 513,944
[22] Filed: Jul. 15, 1983
[51] Int. Cl.⁴ .......................... F16J 15/32; F16D 3/06
[52] U.S. Cl. ........................................ 464/133; 277/12; 277/30; 277/152; 464/162
[58] Field of Search ................... 277/12, 30, 31, 32, 277/152, 153, 212 R, 212 F, 212 FB; 464/114, 133, 162, 172, 173

[56] References Cited

U.S. PATENT DOCUMENTS

| | | | |
|---|---|---|---|
| 2,614,405 | 10/1952 | Clausen | 464/162 X |
| 2,983,125 | 5/1961 | Peickii et al. | 464/173 |
| 3,411,793 | 11/1968 | Jagger et al. | 277/32 |
| 4,033,020 | 7/1977 | Hudgens | 464/162 X |
| 4,153,260 | 5/1979 | Joyner | 464/162 X |
| 4,460,182 | 7/1984 | Brissette | 464/162 X |
| 4,460,183 | 7/1984 | Brissette | 464/162 X |

FOREIGN PATENT DOCUMENTS 2314770 11/1973 Fed. Rep. of Germany ...... 464/173

Primary Examiner—Stuart S. Levy
Assistant Examiner—Daniel P. Stodola

[57] ABSTRACT

Agricultural slip type driveline assemblies are generally of a sliding shaft design. A square shaft is fitted into a square tube slip yoke having an internal cavity that generally mates with the square shaft. The square shaft is generally welded to the square hole yoke. The sealing member is made of a resilient material and has four walls and integral radially inwardly extending ridge members. The walls and ridges generally complement and mate with the square end of a slip yoke that has four grooves on its surface to receive the ridges and hold the seal in place. The walls are joined to four radially inwardly extending walls which in turn are joined to radially inwardly converging square pyramidal walls. The pyramidal walls terminate at four radially outwardly extending reinforcing ribs.

7 Claims, 9 Drawing Figures

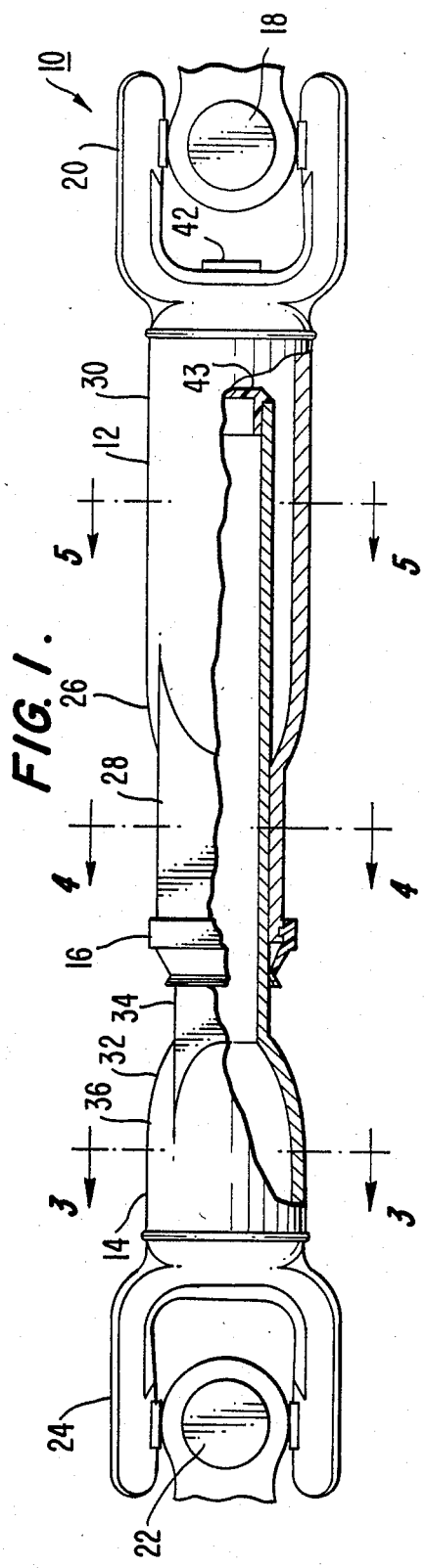
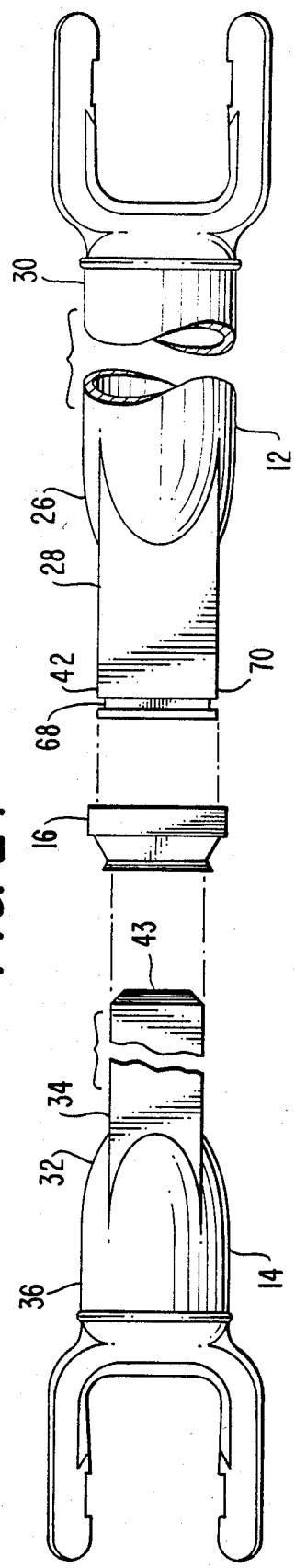
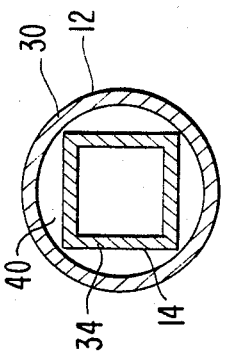
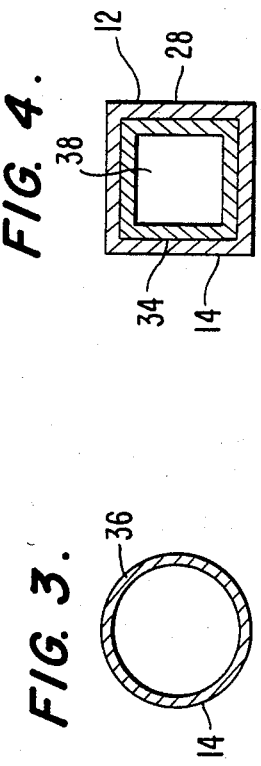

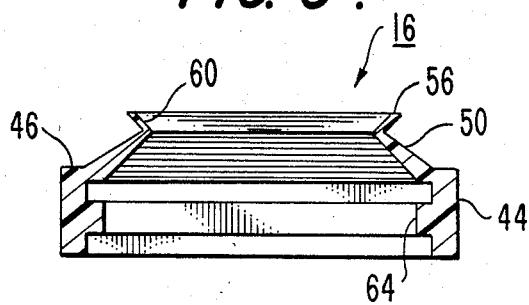
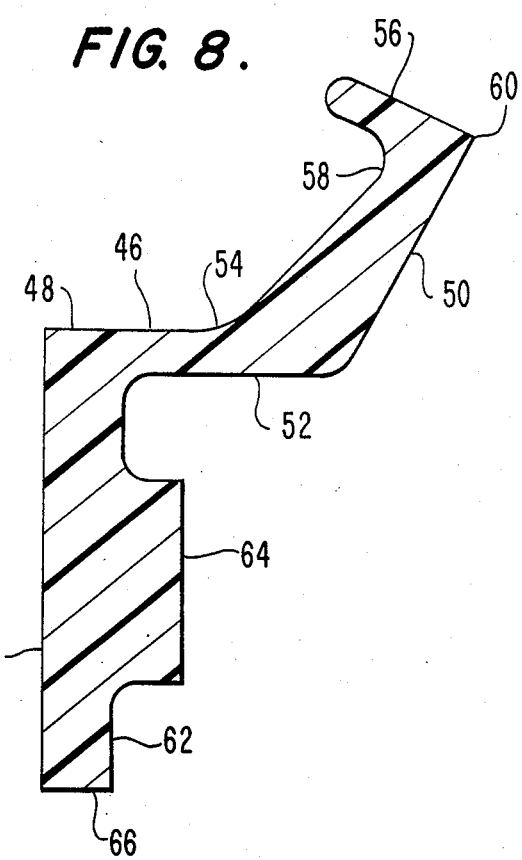
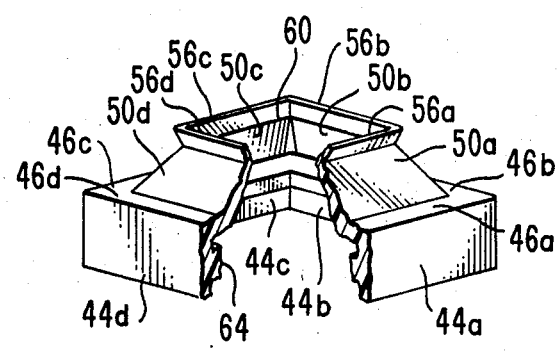
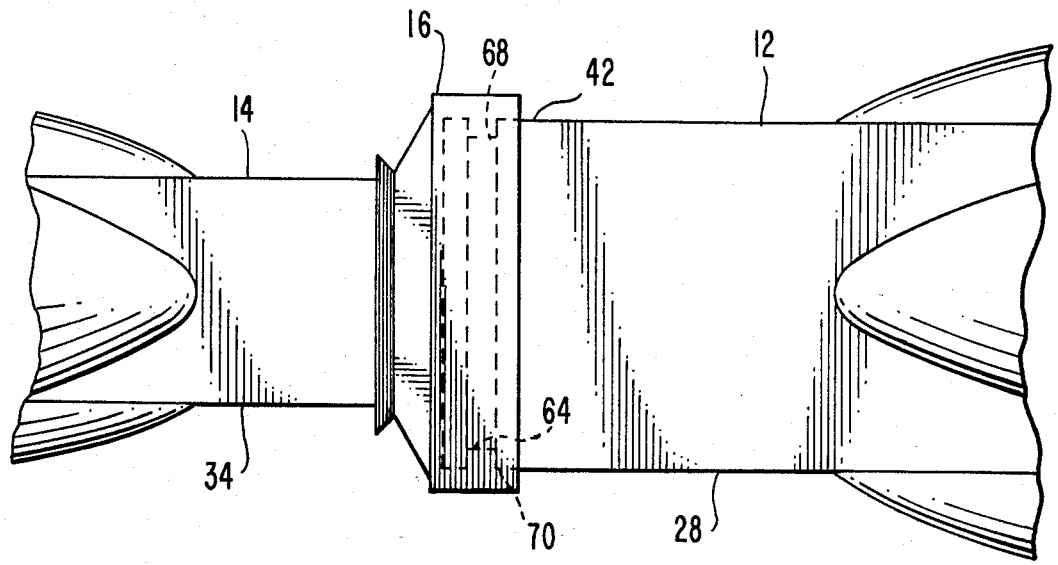

DRIVELINE

FIELD OF INVENTION

This invention relates to drivelines and in particular to an agricultural slip type driveline assembly with a square resilient one piece sealing member.

BACKGROUND OF THE INVENTION

Driveline assemblies are a type of power take off assembly that transfers torque loads from a driving member to a driven member. The driveline assembly usually has a universal joint at each end. The typical cardan type universal joint is basically made up of two yokes each connected to a single center cross with four needle bearings. A fixed driveline assembly is used in applications where the required length of assembly does not vary such as power steering unit. A slip type or telescoping assembly is designed for applications in which the length of the assembly may vary during its normal operation because of application movement or function such as driveline connections between tractors and farming implements in agricultural applications. Typical inter-axle slip type driveline assemblies can operate up to a 45° angle and can have length variations from 12 to over 50 inches.

Agricultural slip type driveline assemblies are generally of a sliding shaft design. A square shaft is fitted into a square tube slip yoke having an internal cavity that generally mates with the square shaft. The square shaft is generally welded to the square hole yoke. Universal joint assemblies are attached to each yoke completing the assembly. The square cavity within the square tube slip yoke generally contains lubricants and is sealed by a plug and a seal which keeps the lubricant in and contaminants out. Although the cross sectional geometry of the slip yoke and shaft are generally square, other configurations such as hexagonal cross sections can be used. In addition, while the square slip yoke and shaft of some agricultural driveline maintains their square cross section over their entire length, some units have a transitional area where the square cross section is modified into a circular cross section.

The seal is generally one of two types: multi-component or one piece. With multiple-component seals, one or more split washers with internal splines are positioned over the end of the slip yoke and held in place by a metal dust cap. The washer sets are usually of metal and cork or nylon and felt construction. With single piece construction, the dust cap is generally rubber and is fitted over the end of a slip yoke. The outer surface of a portion of the seal is generally bonded to a metal band that helps maintain the overall seal geometry and keeps the seal in place.

SUMMARY OF THE INVENTION

The object of this invention is to provide a slip type driveline with a resilient one piece sealing member for agricultural use.

This and other objects are disclosed in the preferred embodiment of a slip type driveline assembly having a first member with a generally polygonal cross section. The first member has a first end with a means for connecting it to the cross of a universal type joint and a second end has an opening into a cavity within the body of the first member. The cavity has a generally polygonal cross section. A second member has a first end portion, a central portion, and a second end portion. The first and central portions are slidably received into the cavity of the first member through the second end of the first member. The outer surface of the first end portion of the second member generally complements the inner surface of the polygonal cavity of the first member. The central portion has a generally polygonal cross section with a smooth surface. The second end of the second member has a means for connecting it to a cross of a universal type joint. A resilient one piece sealing member has means for mounting the sealing member at the second end of the first member. The sealing member has a central opening through which the first and central portions of the second member pass through and into the polygonal cavity of the first member. The central opening of the sealing member is in intimate contact with the surface of the central portion of the second member so that the intimate contact by the central opening combined with the means for mounting, prevents loss or contamination of lubricant in the cavity of the first member. Preferably, the cross section of the polygonal cavity and the first end portion and central portion of the second member is square and the first end and central portions have the same size cross section.

In the preferred driveline the resilient one piece sealing member includes four first walls joined such that the first walls form a square cross section with a square opening. The cross section forms a plane that is perpendicular to the longitudinal axis of the driveline assembly. Four radially inwardly extending second walls are joined to an end of a corresponding first wall. Radially inwardly converging truncated square pyramidal walls are joined at their radially outward ends to the radially inner ends of the second walls. Four radially outward extending reinforcing rib members are joined to the radially inner end of the pyramidal walls. The square cross section formed by the intersection of the reinforcing rib members with the pyramidal walls is slightly less than the cross section of the central portion of the second member.

Preferably, the sealing member means for mounting includes at least one radially inwardly extending ridge member on the inner surface of one of the first walls and is integral therewith. The ridge member is tranversely disposed to the longitudinal axis of the driveline assembly. The ridge member fits into and generally complements a corresponding tranverse groove on the outer surface of one wall of the second end of the first member.

Preferably, the sealing member means for mounting includes four ridge members each located on the inner surface of a corresponding first wall wherein each of the ridge members fits into and generally complements a corresponding groove on the outer surface of a corresponding wall of the second end of the first member. Each groove is transversely disposed to the longitudinal axis of the driveline assembly.

A preferred slip type driveline assembly includes a first hollow tube-like member with a generally polygonal cross section and a means for connecting a first end of the first member to a universal type joint. The first member also has a seal mounting end oppositely disposed from the first end. A shaft member has a generally polygonal cross section with a first end portion whose surface generally complements a cavity formed by the internal surfaces of the first tube-like member and is slidably received therein. A central portion of the shaft member has a generally smooth external surface. A second end has means for connecting the second end to a universal type joint. A resilient one piece sealing member and means for mounting the sealing member is at the seal mounting end of the first tube-like member. The sealing member has a central opening through which the first end portion and central portion of the shaft member pass through and into the first tube-like member. The central opening of the sealing member is in intimate contact with the smooth surface of the central portion of the shaft member so that the intimate contact by the central opening combined with the means for mounting, prevents loss or contamination of lubricant within the first tube-like member.

Preferably, the cross section of the polygonal cavity of the first tube-like member and the first end portion and central portion of the shaft member is square and the first end and central portions have the same size cross section.

In the preferred embodiment, the resilient one piece sealing member includes four first walls are joined such that the first walls form a square cross section with a square opening. The cross section forms a plane that is perpendicular to the longitudinal axis of the driveline assembly. Four radially inwardly extending second walls are joined to an end of a corresponding first wall. Radially inwardly converging truncated square pyramidal walls are joined at their radially outward ends to the radially inner ends of the second walls. Four radially outwardly extending reinforcing rib members are joined to the radially inner end of said pyramidal walls. The square cross section formed by the intersection of the reinforcing rib members with the pyramidal walls is slightly less than the cross section of the shaft member.

Preferably, the sealing member mounting means include at least one radially inwardly extending ridge member on the inner surface of one of the first walls and integral therewith. The ridge member is transversely disposed to the longitudinal axis of the driveline assembly. The ridge member fits into and generally complements a corresponding transverse groove on the outer surface of one wall of the second end of the shaft member. In the preferred embodiment, the sealing member means for mounting includes four ridge members, each located on the inner surface of a corresponding first wall. Each of the ridge members fits into and generally complements a corresponding groove on the outer surface of a corresponding wall of the second end of the shaft member. Each groove is transversely disposed to the longitudinal axis of the driveline assembly.

BRIEF DESCRIPTION OF THE DRAWINGS

FIG. 1 is a plan view of an assembled driveline assembly with a partial cutaway view.

FIG. 2 is an exploded view of a driveline assembly.

FIG. 3 is a view taken through line 3—3 of FIG. 1.

FIG. 4 is a view taken through line 4—4 of FIG. 1.

FIG. 5 is a view taken through line 5—5 of FIG. 1.

FIG. 6 is a cross section of the preferred resilient sealing member.

FIG. 7 is a cutaway isometric view of the preferred resilient sealing member.

FIG. 8 is an enlarged cross section of the preferred resilient sealing member's wall.

FIG. 9 is an enlargement of an assembled square tube slip yoke, sealing member and square shaft.

DESCRIPTION OF THE INVENTION

The preferred driveline assembly 10 as shown in FIG. 1 consists generally of a slip yoke 12, a shaft and yoke assembly 14 and a resilient one piece sealing member 16. A cross and bearing kit 18 is bolted to yoke 20 of slip yoke 12 and a cross and bearing kit 22 is mounted to yoke 24 of square shaft and yoke assembly 14. Slip yoke 12 has a transition length 26 where it changes from cross section tube 28 to a circular cross-section tube 30. Similarly, square shaft and yoke assembly 14 has a transition length 32 where it changes from square cross section shaft 34 to circular cross section shaft 36. Shaft 34 of shaft and yoke assembly 14 is slidably received into the square cavity 38 of square tube section 28 of slip yoke 12. FIG. 4 shows shaft 34 of shaft and yoke assembly 14 in square cavity 38 of tube section 28 of slip yoke 12. FIG. 5 shows shaft 34 in circular cavity 40 of tube section 30 of slip yoke 12. Lubricant within cavities 38 and 40 helps the easy movement of shaft and yoke assembly 14 within slip yoke 12. The lubricant is contained within cavities 38 and 40 by a plug 42 and one piece sealing member 16. Plug 43 is inserted into the open end of square shaft 34 to prevent lubricant from accumulating inside shaft and yoke assembly 14. Sealing member 16 fits over the seal mounting end 42 of tube section 28 of slip yoke 12 and allows shaft 34 to slide therethrough.

The preferred sealing member 16 is made out of a resilient material, usually neoprene rubber, with a durameter hardness of 60 to 70 and a minimum tensile strength of 2000 psi (140 kg/cm$^2$). The preferred line call-out designation for sealing member 16, as defined in the 1977 *Society of Automotive Engineers Handbook*, "Classification System for Electrometric Materials for Automotive Applications-SAE J200h" is 2BC620A14B14C12E014E034F17G21. Sealing member 16 has four walls 44a, 44b, 44c and 44d joined such that walls 44 form a square cross section with a square opening that is in a plane perpendicular to the longitudinal axis of driveline assembly 10. Four radially inwardly extending walls 46a, 46b, 46c and 46d are joined to ends 48 of a corresponding wall 44. Radially inwardly converging truncated square pyramidal walls 50a, 50b, 50c and 50d are joined at their radially outward end 52 to the radially inner end 54 of walls 48. Pyramidal walls 50 are tapered to give them additional strength. Four radially outwardly extending reinforcing rib members 56a, 56b, 56c and 56d are joined to the radially inner ends 58 of pyramidal walls 50. The intersection edges 60 formed by the intersection of walls 50 with corresponding ribs 56 form a square cross section slightly smaller than the cross section of shaft 34 on shaft and yoke assembly 14. The resulting close contact between edges 60 and shaft 34 will generally prevent lubricant from leaking out of cavities 38 and 40 of slip yoke 12 and prevent dust from entering.

The inner surface 62 of walls 44 of sealing member 16 has at least one radially inwardly extending ridge member 64 that is formed integrally therewith. Ridge member 64 is generally centered on inner surface 62 between ends 48 and 66 of walls 44, although its position can vary along wall 44. Ridge member 64 is transversely disposed to the longitudinal axis of the drive assembly 10.

A groove 68 is cut along the entire width of one face of the slip yoke 12 at seal mounting end 42. The depth of groove 68 is generally equal to the thickness of ridge member 64. In addition, the width of groove 68 is generally equal to the width of ridge member 64. When assembled, the inner surface 62 of sealing member 16 along wall 44 generally complements the outer surface 70 of slip yoke 12 at seal mounting end 42. Since ridge member 64 is fitted within groove 68, the resilient sealing member 16 is prevented from moving axially relative to slip yoke 12 and the lubricant is contained within cavities 38 and 40. In a preferred embodiment, there are four ridge members 64 located on the inner surface 62 of a corresponding first wall 44. Each ridge member 64 fits into and generally complements a corresponding groove 68 on the outer surface 70 of a corresponding wall at the seal mounting end 42 of slip yoke 12.

While the preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the amended claims.

I claim:

1. A slip-type driveline assembly comprising:

a first member with a generally polygonal cross section, said first member having a first end with means for connecting it to a cross of a universal type joint and a second end having an opening into a cavity within the body of said first member, said cavity having a generally polygonal cross section, wherein the outer surface of one wall of said second end of said first member includes a transverse groove;

a second member having a first end portion, a central portion, and a second end portion, said first and central portions being slidably received into said cavity of said first member through the second end of said first member, the outer surface of said first end portion of said second member generally complementing the inner surface of said polygonal cavity of said first member, said central portion having a generally polygonal cross section with smooth surface, said second end portion of said second member having means for connecting it to a cross of a universal type joint; and a resilient one-piece sealing member including:

(a) four first walls being joined such that said first walls form a square cross section with a square opening, said cross section forming a plane that is perpendicular to the longitudinal axis of said driveline assembly, (b) four radially inwardly extending second walls joined to an end of a said corresponding first wall, (c) radially inwardly converging truncated square pyramidal walls, the radially outward ends of said pyramidal wall being joined to the radially inner ends of said second walls, (d) four radially outwardly extending reinforcing rib members joined to the radially inner end of said pyramidal walls wherein the square cross section formed by the inner section of said reinforcing rib members with said pyramidal walls is slightly less than the cross section of said second member that slidably passes therethrough, and (e) means for mounting said sealing member at the second end of said first member, said mounting means including at least one radially inwardly extending ridge member on the inner surface of one of said first walls and integral therewith, said ridge member being transversely disposed to the longitudinal axis of said driveline assembly and fits into and generally complements the transverse groove.

2. The driveline assembly of claim 1 including four ridge members, each ridge member being located on the inner surface of a corresponding first wall, wherein each of said ridge members fits into and generally complements said transverse groove.

3. The driveline assembly of claim 2 wherein said ridge members are generally centered on said inner surface of said first walls.

4. The driveline assembly of claim 1 wherein the cross sections of said polygonal cavity and said first end portion and central portion of said second member are square.

5. The driveline assembly of claim 4 wherein said first end portion and said central portion of said second member have the same size cross section.

6. The driveline assembly of claim 1 wherein the thickness of said truncated pyramidal walls varies from its juncture with said radially inwardly extending second walls to its juncture with said reinforcing rib members.

7. The driveline assembly of claim 6 wherein the thickness of said truncated pyramidal walls decreases from its juncture with said radially inwardly extending second walls to its juncture with said reinforcing rib members.

* * * * *